United States Patent [19]

Davidson

[11] 4,040,955

[45] Aug. 9, 1977

[54] METHOD OF TREATING WASTEWATER CONTAINING EMULSIFIED OILS

[75] Inventor: Dennis D. Davidson, Detroit, Mich.

[73] Assignee: Chrysler Corporation, Highland Park, Mich.

[21] Appl. No.: 604,698

[22] Filed: Aug. 14, 1975

[51] Int. Cl.² .................. B01D 21/01; C02B 1/20
[52] U.S. Cl. ............................ 210/44; 210/45; 210/51
[58] Field of Search ............ 210/DIG. 21 C, 43, 45, 210/DIG. 21 P, 46, 44, 51

[56] References Cited

U.S. PATENT DOCUMENTS

| | | | |
|---|---|---|---|
| 2,128,569 | 8/1938 | Velz | 210/46 |
| 3,347,786 | 10/1967 | Baer et al. | 210/45 |
| 3,494,864 | 2/1970 | Wilihnganz | 210/45 |

Primary Examiner—Frank A. Spear, Jr.
Assistant Examiner—E. Rollins Cross
Attorney, Agent, or Firm—Talburtt & Baldwin

[57] ABSTRACT

An improvement in the method of "breaking" emulsions of oil in water by the formation of an oil adsorbing floc in which floc is recycled from one batch of wastewater to subsequent batches during the treatment.

14 Claims, No Drawings

METHOD OF TREATING WASTEWATER CONTAINING EMULSIFIED OILS

BACKGROUND

This invention is concerned with wastewater purification for disposal purposes and with the reclamation of waste oils contained therein. In particular, it is concerned with industrial wastewaters which contain dissolved and emulsified oils, such as water soluble oils, cutting oils, hydraulic oils, drawing compounds and the like.

Treatment of such wastewaters for disposal has generally been accomplished by forming an oil gathering or oil adsorbing floc in the water (sometimes referred to as chemical coagulation).

One of the more conventional coagulation or flocculation techniques is the one known as the acid-alum-lime sedimentation method. In it, the wastewater to be treated is usually acidified to adjust its pH to about 3.5. Free oils are skimmed from its surface. Alum is added, followed by additions of lime to adjust the pH to about 6-8. Floc formation (aluminum hydroxide) and coagulation occurs. The emulsion is broken and oil is absorbed from the water by the floc. If it is desired to reclaim the oil, the oil-laden flock is separated from the water and the oil may be removed therefrom. It is an object of this invention to improve such coagulation and flocculation techniques by providing for the reuse on recycling of substantial amounts of the floc forming constituent, such as the alum mentioned in the foregoing example, to effect both cost and chemical savings.

It is an object to effect the foregoing in facilites already using flocculation techniques with only minor equipment changes being required.

It is an overall object of this invention to improve treatment techniques and to decrease costs in reclaiming emulsified oils from industrial wastewaters.

These and other objects will become apparent from the following description of the invention.

SUMMARY OF THE INVENTION

As already indicated, the main feature of this invention lies in recycling a floc forming constituent which is used to break oil-water emulsions. Since the acid-alum-lime technique is the most common, this invention will be described specifically in that context. However, it may be used to advantage in any coagulation or flocculation technique wherein an oil adsorbing floc is formed in situ during wastewater treatment. For example, it maybe used in a method with acid, alum and caustic as described above except that sodiumm or potassium hydroxide may be used for neutralization rather than lime. Those methods which make use of an initial addition of gross amounts of alum to break the emulsion followed by neutraliation with the above mentioned chemicals will find this invention useful. Methods of the above type which use coagulant aids to decrease the alum useage (supplemental use only) will also find this invention useful. Methods which use organic emulsion breakers followed by small amounts of alum may also make use of this invention.

More specifically, the main feature of this invention lies in the concentration and resolubilization of alum floc after it has been formed in the wastewater and the emulsion has been broken. The resolubilized, i.e., dissolved alum is held for mixing with a subsequently added quantity of wastewater requiring treatment. Due to the reuse on recycling of alum, lower alum dosage is required in successive quantities of wastewater which are treated. Laboratory tests have shown an alum recycle of from 50-70% may be readily achieved. Consequently, treatment costs are lowered, considerably particularly since alum represents the most expensive portion of the treatment costs.

The invention comprises forming a floating oil adsorbing floc in a batch of wastewater containing emulsified oils, separating most of the resulting clarified water from the oil laden floc, leaving a slurry or a relatively small quantity of the water plus the floc and the oil. The pH of the slurry is adjusted to cause a substantial portion of floc to dissolve in the retained water. In the case of alum, the pH is adjusted by a pH of about 3 or less. Consequently, the remaining floc becomes oil enriched. An additional quantity of wastewater to be treated is added to the slurry and floc reforms breaking the emulsion in the added wastewater. If pH adjustment is necessary at this point it is accomplished by appropriate acid or caustic addition. The oil laden floc is removed and the water if not clarified is subjected to additions of more alum. In such a case, lesser amounts of alum will be required than was necessary in the first batch. The treatment may be carried on through a continuing series of successive batches of wastewater.

DESCRIPTION OF THE PREFERRED EMBODIMENTS

The preferred embodiment of the inventive method is carried out in a tank having a bottom drain through which clarified water can be removed following treatment. Another tank may be provided for collecting and holding wastewater to be treated. Successive batches of the wastewater are transferred from the holding tank to the treatment tank. Following transfer of a batch of wastewater to the treatment tank for treatment, free oils floating on the surface are skimmed off and saved for reclamation purposes if desired. If the pH of the batch is not within the range of about 7-8 it is preferably adjusted. Then a quantity of alum (aluminum sulfate $Al_2(SO_4)_3 \cdot 14.3\ H_2$) is added to break the oil/water emulsion. The pH is again adjusted if necessary to a range of about 6-7. The batch is slowly mixed while flocculation and coagulation occur following which the oil ladened floc rises to the surface of the water. If the water is not clear, additional alum may be added. After standing for a time, the subjacent clear water is drained from the tank for disposal while a small amount of the water (5-10%) is retained in the tank with the floc and oil. This slurry is then treated with sulfuric or any other acid to adjust the pH to about 3 or less and it is strongly agitated. A high percentage of the floc dissolves and remaining floc has a higher adsorbed oil content. It rises to the surface on standing.

A second batch of wastewater is added to the slurry in the tank with gentle mixing. Floc reforms in this mixture breaking the oil/water emulsion in the added wastewater and floating to the surface after mixing and a period of standing. The floating oil/floc layer is skimmed off for reclamation of the oil. If the water is not clear, additional alum may be added. The clarified water is drained leaving a slurry of any floc formed and the entire procedure is repeated on successive batches of the wastewater.

In addition to the savings afforded in the reuse of alum, this method concentrates the oil in smaller amounts of floc, which contains lesser amounts of water. This mechanism for concentration, i.e., reduction of water content is an important feature. Such concentrated floc is more valuable for oil reclamation purposes.

EXAMPLE A-1

Treatment of wastewater collected in an industrial plant. The wastewater contained about 800 – 1000 ppm emulsified oil, any free oil having been previously skimmed. The water was milky yellow in color and turbid. Its initial pH was 8.

1. A jar test was performed on 250 milliliters (1/4 liter) of the wastewater to determine the amount of alum required to clarify a 20 liter batch. This was accomplished by using an aqueous of 48% dry alum (aluminum sulfate $Al_2(SO_4)_3 \cdot 14.3 H_2O$), balance water; 1 milliliter of the aqueous solution contains 54 mg. of the dry alum. The solution was added to the 250 milliliters of the wastewater drop by drop to determine the optimum dosage for the treatment, i.e., the minimum amount of alum required to break the oil-water emulsion of this particular wastewater. The 250 milliliter sample required 0.6 milliliters. Therefore, it was calculated that (0.6 milliliters x 4 milliliters x 20 liters) or 48 milliliters of the alum solution would be required to treat a 20 liter batch of this wastewater.

2. 48 milliliters of the alum solution were added to a 20 liter batch (Batch No. 1) of the wastewater which was held in a tank.

3. The water was rapidly mixed with a motor driven stirrer for about 5 minutes. The pH was 6.5. Floc formation occurred and it floated to the surface carrying with it adsorbed oil leaving the water slightly cloudy. This indicated that additional alum was required to completely break the emulsion.

4. An additional 5 milliliters of the alum solution was added to the tank. The pH remained at 6.5 after an additional 5 minutes of stirring. Small particles of floc formed in the water.

5. 1 ppm Anionic Coagulant Aid ( American Cyanimid Magna floc 836-A) was added.

6. The water was mixed slowly to flocculate the small particles into larger particles which float more readily.

7. The water was allowed to stand quiescent for 75 minutes. The emulsion was observed to be broken and the water was clear.

8. 18 liters of clarified water (90%) was drained from the bottom of the tank for disposal. 2 liters of floc + oil + water (slurry) were retained. Its pH was 6.5.

9. A jar test was prepared by taking a 100 milliliter sample of the slurry and a 50 % aqueous solution of $H_2SO_4$ was added dropwise to determine the amount of acid necessary to lower the pH to 3 or less. This is the pH at which a substantial amount of the floc dissolves in the remaining water, leaving the adsorbed oil concentrated in a lesser amount of floc. 2 drops of the acid accomplished this. It was calculated that (1.9 liters = 19 × 100 milliliters; 2 drops × 19 is 38 drops) or 1.8 milliliters of acid was necessary to adjust the pH in the 1.9 liters of slurry to 3 or less.

10. 38 drops of the 50% solution of $H_2SO_4$ was added to the 1.9 liters of slurry. The resultant pH was 2.8 – 2.9.

11. The slurry was rapidly mixed with vigorous agitation for 5 minutes. A minor amount of undissolved floc with all the adsorbed oil remained while a substantial amount of the floc redissolved. The remaining floc was enriched as to oil content and was skimmed off the aqueous slurry on which it was floating.

12. An additional quantity of wastewater of the kind used in step 1 above and requiring treatment (18 liters) was added to the remaining aqueous slurry in the tank to provide a total of about 20 liters (Batch No. 2) requiring treatment. The dissolved floc reprecipitated upon addition of this wastewater, which was alkaline (8.0 pH), to the slurry and caused the oil emulsion to break almost completely. The reprecipitation of the dissolved floc is termed herein the recycling of alum from batch to batch. The water was not quite clear. Therefore some oil remained emulsified in the water.

13. Additional treatment was required for complete clarification so a 250 milliliter sample was removed for a jar test. 0.35 milliliters of alum solution were added to the sample. The pH went to 5.8 which is considered to be too low for optimum floc formation. Therefore the pH was adjusted to a higher value by the addition of 0.1 milliliters NaOH (5% solution). Floc formation occurred and the oil emulsion broke to leave clarified water. Thus, if 250 milliliters required 35 milliliters of alum, 25 milliliters are required to treat the full Batch No. 2.

14. 25 milliliters of the alum solution was added to Batch No. 2. The pH was 5.6 and was adjuted with NaOH solution to a pH of about 6–7. Floc formation occurred.

15. 0.5 – .75 mg./1 of coagulant was added to insure coagulation and flotation.

16. The water was allowed to stand quiescent for 30 minutes. The emulsion broke. Floc + oil floated to the surface and the water clarified. Clear water is known from experience to contain less than 10 ppm oil.

EXAMPLE A-1 DEMONSTRATES

Batch No. 1 required 48 milliliters of alum solution. 1 milliliter of alum solution contains 54 mg. alum; (48 × 54)/221 = 118 mg/liter = 118 ppm of alum were required to treat Batch No. 1.

Batch No. 2 required 25 milliliters of alum solution. 1 milliliter of alum solution contains 54 mg. alum; (25 × 54)/22 = 61.5 mg/1 – 61.5 ppm of alum were required to treat Batch No. 2.

Batch No. 2 was identical in emulsified oil content to Batch No. 1 and required less alum to clarify it due to the recycling of alum in step 12 from Batch No. 1 to Batch No. 2.

Also, Step 11 points up another advantage of this invention in addition to the chemical and cost savings afforded by recycling of the alum. In Step 11, it is pointed out that the alum-oil which skimmed off the water is concentrated or enriched in that the amount of the floc is decreased due to the dissolution of a substantial portion of it leaving a smaller amount of floc to which the adsorbed oil attaches itself.

For reclamation of oil, such an enriched floc is more valuable since it contains about 35% oil versus the typical floc resulting from the prior art alum treatment in which the floc contains on the order of about 10% oil. Also, the enriched floc contains much less water. This makes the difference between having to pay an oil reclamation company for hauling the oil laden floc away and having such a company buy the enriched oil laden floc.

EXAMPLES A-2 THROUGH A-6

Subsequent treatment of batches of wastewater similar to the above Example A-1 provided similar results as to the amounts of alum required in treating the initial batch of wastewater and then a second batch.

| AMOUNT OF ALUM REQUIRED FOR CLARIFICATION | | | |
|---|---|---|---|
| EXAMPLE | BATCH No. 1 | (ppm) | BATCH No. 2 |
| A-2 | 130 | | 60 |
| A-3 | 110 | | 22 |
| A-4 | 163 | | 60 |
| A-5 | 163 | | 70 |
| A-6 | 172 | | 55 |

In each case, the second batch required less alum than the first due to the recycling of the alum from the first batch.

EXAMPLE B

Treatment of wastewater collected in an industrial plant. The waste contained about 800–1000 ppm emulsified oil, any free oil having been previously skimmed. The water was milky yellow in color and turbid with an initial pH of 7.9.

1. 45 milliliters of the alum solution (120 ppm dry alum) were added to a 20 liter batch (Bathc No. 1) of the wastewater which was held in a tank.

2. The water was rapidly mixed with a motor driven stirrer for several minutes. Floc formation occured.

3. The water was allowed to stand quiescent for about 1 hour. The emulsion was observed to be broken as floc + oil floated to the surface and the water was clear.

4. 18 liters of clarified water (90%) was drained from the bottom of tank for disposal. 2 liters of floc + oil + water (slurry) were retained.

5. 20 drops of 50% solution of $H_2SO_4$ (450 ppm) was added to the 2 liters of slurry.

6. The slurry was rapidly mixed with vigorous agitation for 5 minutes. A minor amount of undissolved floc with the oil remained while a substantial amount of the floc dissolved. The remaining floc was enriched as to oil content since there was less floc relative to the amount of oil present and it was skimmed off the aqueous slurry on which it was floating.

7. An additional quantity of the wastewater requiring treatment (about 18 liters) was added to the remaining aqueous slurry in the tank to provide a total of about 20 liters (Batch No. 2 ) requiring treatment. The dissolved floc reprecipitated upon addition of this wastewater, which was alkaline (8.0 pH), to the slurry and caused the oil emulsion to break. The water was not quite clear however.

8. 8 milliliters of the alum solution (22 ppm dry alum) was added to Batch No. 2 for further clarification.

9. The water was allowed to stand quiescent for 30 minutes. The emulsion broke and the water clarified. Clear water is known to contain less than 10 ppm oil.

10. 18 liters of the clarified water (90%) was drained from the bottom of the tank for disposal. 2 liters of floc + oil + water (slurry) were retained.

11. 15 drops of 50% solution of $H_2SO_4$ (340 ppm) was added to the slurry.

12. The slurry was rapidly mixed with vigorous agitation for several minutes. A minor amount of undissolved floc with the oil remained while a substantial amount of the floc dissolved. The remaining floc, enriched as to oil content, was skimmed off.

13. A different wastewater, containing more oil than the original wastewater treated in steps 1–12, (pH 8.2) was selected for treatment. By jar test it was determined that 60 milliliters of alum solution (163 ppm) of dry alum would be required to break the emulsion.

14. 19 liters of the wastewater treated in step 13 was added (Batch No. 3 ) to the slurry of step 12. Floc formation occurred but the water was not clear.

15. An additional 21 milliliters of alum solution was added and stirred for about 15 minutes.

16. 1 ppm Coagulant Aid was added.

17. Light fluffy floc formation occured and it floated to the surface with adsorbed oil leaving the water clear after standing for about 40 minutes.

18. 18 liters of the water was drained from the tank.

19. 16 milliliters of the 50% $H_2SO_4$ (375 ppm) solution was added to the retained 2 liters of slurry (floc + oil + water).

20. 18 liters of the same untreated wastewater was added to the tank (Batch No. 4) as was added in step 14 above. The pH increased from about 3 up to 6.7 as the water was added to the slurry in the tank. Floc formation occurred and the mixture was stirred vigorously.

21. 25 milliliters of alum solution (70 ppm) was added to insure complete breaking of the emulsion. Good separation and flotation of the floc on the water was observed. The emulsion was broken and the water clarified on standing.

22. 18 liters of the water was drained for disposal and the slurry was used in the treatment of additional quantities of wastewater.

EXAMPLE B DEMONSTRATES

Continuous recycling of alum slurry through many batches of wastewater provides continuous savings as to the amount of alum which must be used overall.

The alum can be recycled through different wastewaters.

What is claimed is:

1. In the method of treating industrial wastewater for the removal of oil dispersed therein in which a floc forming constituent is added to the water and upon formation of floc a substantial amount of oil is adsorbed from the water, the improvement comprising: separating most of the wastewater from the floc after adsorption has occurred and retaining a minor amount of the wastewater with the floc, dissolving a substantial amount of the floc in the retained wastewater whereby the retained wastewater becomes enriched in the dissolved floc forming constituent and the remaining floc becomes enriched in adsorbed oil, separating the remaining floc from the enriched retained wastewater, and adding untreated wastewater to the enriched retained wastewater whereby floc reforms and adsorbs oil from the wastewater.

2. The method according to claim 1 including the additional steps of adjusting pH and adding additional floc forming constituents if necessary to remove additional amounts of oil.

3. The method according to claim 2 wherein the pH is adjusted to about the range of 5–8.

4. The method according to claim 1 wherein the pH is adjusted initially to a range of about 5 to 8.

5. The method according to claim 1 wherein the floc forming constituent is a water soluble aluminum salt.

6. The method according to claim 5 wherein the salt is alum.

7. The method according to claim 1 wherein the floc is dissolved by adding acid to the retained wastewater.

8. The method according to claim 7 wherein the acid is added until the pH of the retained wastewater is about 3.1 or less.

9. The method according to claim 7 wherein the acid is sulfuric acid.

10. The method according to claim 1 wherein the wastewater is separated from the floc and retained wastewater by draining.

11. A method for the flotation of oil from industrial wastewater comprising the steps:

adjusting the pH of the wastewater to about 5 to 8 if required, adding alum to the wastewater to form an oil adsorbing aluminum hydroxide floc, slowly mixing the wastewater and floc to facilitate floc formation and oil adsorption without causing undue break-up of the floc, drawing a substantial amount of the wastewater away from the floc while retaining some wastewater with it, adding acid to the floc and retained wastewater to dissolve a substantial amount of the floc in the retained wastewater, mixing the remaining floc and retained wastewater, removing any remaining floc from the retained wastewater adding an additional quantity of untreated wastewater to the retained wastewater, removing any floating oil and any floc which forms, and repeating the steps set forth above.

12. The method according to claim 11 including the optional step of adjusting the pH of the wastewater to about 6-7 following the alum addition.

13. The method according to claim 11 wherein the amount of retained wastewater is about 5-10% of the total amount initially treated.

14. The method according to claim 11 wherein the acid is added to the floc and retained wastewater until the pH is below at least about 3.1.

* * * * *